(12) United States Patent
Sarkkinen et al.

(10) Patent No.: US 8,385,361 B2
(45) Date of Patent: Feb. 26, 2013

(54) MULTICAST TRANSMISSION TO A RADIO ACCESS NETWORK

(75) Inventors: Sinikka Sarkkinen, Kangasala (FI); Jari Isokangas, Tampere (FI); Dimitris Koulakiotis, London (GB)

(73) Assignee: Intellectual Ventures I LLC, Wilmington, DE (US)

( * ) Notice: Subject to any disclaimer, the term of this patent is extended or adjusted under 35 U.S.C. 154(b) by 1223 days.

(21) Appl. No.: 10/493,162

(22) PCT Filed: Oct. 19, 2001

(86) PCT No.: PCT/EP01/12133
§ 371 (c)(1),
(2), (4) Date: Aug. 26, 2004

(87) PCT Pub. No.: WO03/037003
PCT Pub. Date: May 1, 2003

(65) Prior Publication Data
US 2004/0264490 A1    Dec. 30, 2004

(51) Int. Cl.
*H04J 3/26* (2006.01)
(52) U.S. Cl. ........................................ 370/432
(58) Field of Classification Search .............. 370/390, 370/432, 473, 328, 329, 338
See application file for complete search history.

(56) References Cited

U.S. PATENT DOCUMENTS

| | | | | |
|---|---|---|---|---|
| 5,953,331 A * | 9/1999 | Duncan et al. | | 370/352 |
| 6,625,773 B1 * | 9/2003 | Boivie et al. | | 714/749 |
| 6,647,020 B1 * | 11/2003 | Maher et al. | | 370/432 |
| 6,778,532 B1 * | 8/2004 | Akahane et al. | | 370/392 |
| 6,853,627 B1 * | 2/2005 | Evans | | 370/312 |
| 6,988,146 B1 * | 1/2006 | Magret et al. | | 709/238 |
| 6,999,753 B2 * | 2/2006 | Beckmann et al. | | 455/412.2 |
| 7,181,027 B1 * | 2/2007 | Shaffer et al. | | 381/94.1 |
| 2002/0111180 A1 * | 8/2002 | Hogan et al. | | 455/518 |
| 2002/0151304 A1 * | 10/2002 | Hogan | | 455/436 |
| 2003/0017836 A1 * | 1/2003 | Vishwanathan et al. | | 455/517 |
| 2003/0028644 A1 * | 2/2003 | Maguire et al. | | 709/226 |
| 2003/0035393 A1 * | 2/2003 | Sinnarajah et al. | | 370/335 |
| 2004/0190450 A1 * | 9/2004 | Charas et al. | | 370/229 |
| 2005/0054348 A1 * | 3/2005 | Turina et al. | | 455/453 |

FOREIGN PATENT DOCUMENTS

| | | |
|---|---|---|
| WO | WO 99/49686 | 9/1999 |
| WO | WO 00/57601 | 9/2000 |
| WO | WO 01/03449 A1 | 1/2001 |
| WO | WO 01/43479 A1 | 6/2001 |

OTHER PUBLICATIONS

LG Information & Communications, Ltd. Korea, "Definitions and Characteristics of Multicast Channels", Stockholm Mar. 8-11, 1999, pp. 1-11.*

Gessner et al, "Layer 2 and Layer 3 of UTRA-TDD", VTC 2000-Spring, 2000 IEEE 51$^{st}$ Vehicular Technology Conference Proceedings. May 15-18, 2000, vol. 2 of 3. Conf. 51, May 15, 2000, pp. 1181-1185, XP000968056.

* cited by examiner

*Primary Examiner* — Kwang B Yao
*Assistant Examiner* — Tung Q Tran

(57) ABSTRACT

The present invention relates to a method and system for performing a multicast transmission in a cellular network, wherein an identification information, which indicates terminal devices and/or areas in which authorized terminal devices are assumed to be located, is transmitted from a core network (100) to a radio access network of the cellular network by using a control information transmission protocol. Then, a signalling connection of a control and user data transmission protocol is establishing based on said identification information and used for transmitting multicast related data and corresponding control information between the core network (100) and the radio access network. Thereby, already defined protocol layers can be used for implementing multicast transmission, while modifications are minimized.

23 Claims, 3 Drawing Sheets

MULTICAST TRANSMISSION TO A RADIO ACCESS NETWORK

FIELD OF THE INVENTION

The present invention relates to a method, system and network element for providing a multicast transmission from a core network to a radio access network, e.g. to a Universal Mobile Telecommunications System Terrestrial Radio Access Network (UTRAN).

BACKGROUND OF THE INVENTION

In the 3GPP ($3^{rd}$ Generation Partnership Project) specification TS 23.041, a CBS (Cell Broadcast Service) is defined, which is similar to the Teletex service offered on television, in that like Teletex, it permits a number of unacknowledged general CBS messages to be broadcast to all receivers within a particular region. CBS messages are broadcast to defined geographical areas known as cell broadcast areas. These areas may comprise of one or more cells, or may comprise the entire cellular network. Individual CBS messages will be assigned their own geographical coverage areas by a mutual agreement between the information provider and the network operator. CBS messages may originate from a number of Cell. Broadcast Entities (CBEs), which are connected to a Cell Broadcast Centre (CBC). CBS messages are then sent from the CBC to the cells, in accordance with the CBS's coverage requirements.

The work to standardize multicast transmission as a new service has been started in 3GPP. The aim is to enhance the current capabilities not only in UTRAN but also in core networks, so as to provide a service using common network resources and being provided only to a restricted group of people in a cell. These requirements are not yet fulfilled in the above described cell broadcast concept.

Basically the standardisation of the multicast type of service means that the new service concept should be capable of transmitting data simultaneously to a group of people, who previously indicated their interest to receive data belonging to a multicast service. Thus, when the multicast related data is transmitted from the core network to the UTRAN, this data is not addressed to only one user equipment (UE), but to a group of UEs which may even be located in different cells.

However, the known CBS is designed for transmission of cell broadcast messages, which in practice means that all UEs, which are in the cell, are allowed to received the transmitted data. Therefore, the functionality of the CBC doesn't provide any solution e.g. how different UEs in a multicast group can be identified and how the evaluation between the cells (e.g. the number of UEs in the cell, the load of the cell etc.) and between the different sessions (e.g. delay requirements for the transmission, priority of the session etc) can be taken care of.

SUMMARY OF THE INVENTION

It is therefore an object of the present invention to provide a multicast transmission function from a core network to a radio access network.

This object is achieved by a method of performing a multicast transmission in a cellular network, said method comprising the steps of:
transmitting an identification information, which indicates terminal devices and/or areas in which authorized terminal devices are assumed to be located, from a core network to a radio access network of said cellular network by using a control information transmission protocol;
establishing based on said identification information a signalling connection of a control and user data transmission protocol; and
using said established signalling connection for transmitting multicast related data and corresponding control information between said core network and said radio access network.

Furthermore the above object is achieved by a system for performing a multicast transmission in a cellular network, said system comprising:
a core network node for transmitting an identification information, which indicates terminal devices and/or areas in which authorized terminal devices are assumed to be located, to a radio access network of said cellular network by using a control information transmission protocol; and
a radio access network node for receiving said identification information and for establishing based on said identification information a signalling connection of a control and user data transmission protocol;
wherein said established signalling connection is used for transmitting multicast related data and corresponding control information between said core network node and said radio access network node.

Additionally, the above object is achieved by a network node for providing a multicast transmission in a cellular network, said network node being adapted to transmit an identification information, which indicates terminal devices and/ or areas in which authorized terminal devices are assumed to be located, to a radio access network of said cellular network by using a control information transmission protocol.

In addition thereto, the above object is achieved by a network node for providing a multicast transmission in a cellular network, said network node being adapted to receive an identification information, which indicates terminal devices and/ or areas in which authorized terminal devices are assumed to be located, and to establish based on said identification information a signalling connection of a control and user data transmission protocol, wherein said established signalling connection is used for transmitting multicast related data and corresponding control information.

Accordingly, by using the control information transmission protocol for transmitting the identification information required for establishing the signalling connection, already defined protocol layer can also be used for multicast related data transmission. Therefore, no new protocol layer is required.

The signalling connection may be established by creating a virtual context for a multicast session at the radio access network. The virtual context may, be coupled to several subscriber identities or/and multicast area identities. The virtual context may have the signalling connection as a single signalling connection. Thus, one signalling connection is related to several terminal devices or/and multicast area IDs.

In particular, the control information transmission protocol may be the RANAP protocol and the signalling connection may be an Iu interface connection.

The identification information may be transmitted by using a paging message. Alternatively, the identification information may be transmitted by a multicast calling procedure provided between the radio access network and the core network.

Furthermore, a multicast radio access bearer assignment procedure may be used to establish the signalling connection. This multicast radio access bearer assignment procedure may comprise a radio access bearer assignment request message containing an information which indicates terminal devices or predetermined areas to which the multicast transmission is directed.

The signalling connection may be established when a new multicast session is created, and released after said multicast session is terminated, or it may be established when the first multicast session is created, and then used for other multicast sessions. Then, different interface resources may be reserved based on quality requirements of data types transmitted through the signalling connection, or one pipe may be reserved for all kinds of data types transmitted through the signalling connection.

A multicast support mode is provided in the Iu User Part protocol layer to transmit the multicast related data and the corresponding control information. In this case, the control information may be divided into multicast data related control information and other connection related data. The multicast related control information may be transmitted using an inband signalling.

As an alternative, a multicast service mode may be provided in the SABP of a cell broadcast centre to transmit the multicast related data and the corresponding control information. Then, control and data frames may be transmitted between the cell broadcast centre and an enhanced BMC (Broadcast/Multicast Control) protocol layer at an RNC of the radio access network. Alternatively, the control and data frames are transmitted between the cell broadcast centre and a multicast related protocol layer at the RNC. Furthermore, the control and data frames may be divided into data frames, data related control frames and management control frames.

As a further alternative, a multicast area broadcast protocol layer may be provided on the IuBC-interface of the cell broadcast centre to transmit the multicast related data and the corresponding control information.

As a still further alternative, a predetermined field may be added to data packets of the SABP of the cell broadcast centre to separate the multicast related data and the corresponding control information from the cell broadcast related data.

Hence, multicast related data can be separated from cell broadcast related data to thereby avoid radical modifications of the conventional cell broadcast concept.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
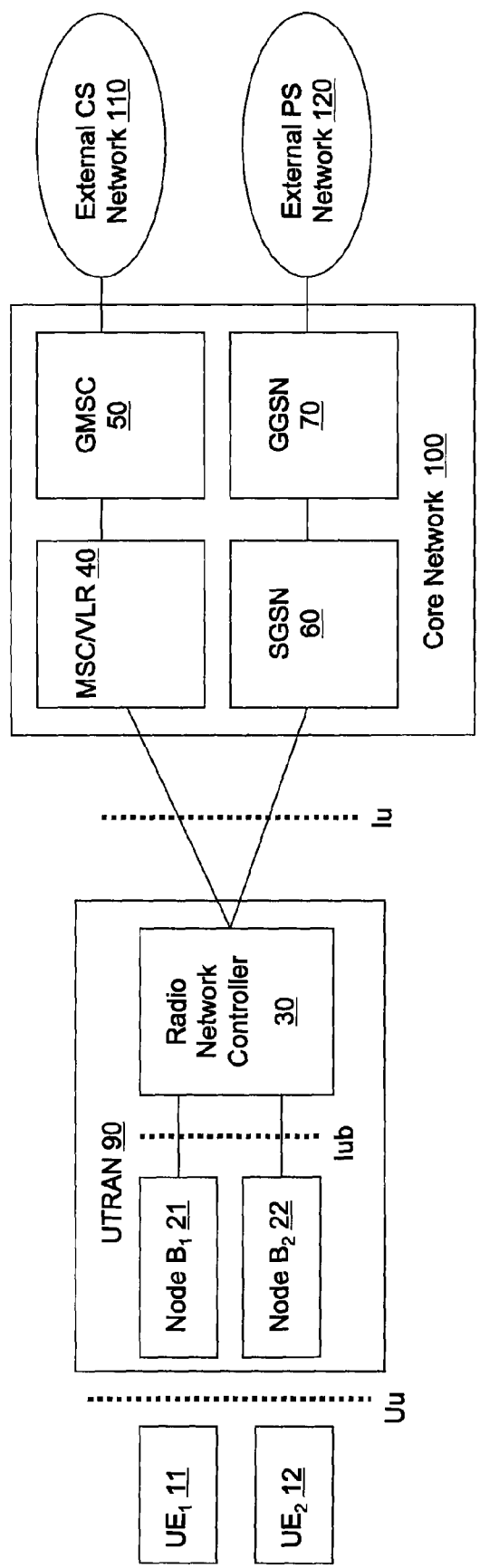
FIG. 1 shows a schematic block diagram indicating a network architecture in which the present invention can be applied.

The preferred embodiments will now be described on the basis of a network architecture comprising a UTRAN 90 and a core network (CN) 100, as shown in FIG. 1.

According to FIG. 1, a first and a second UE 11, 12 are connected via the Uu radio interface to respective first and second node Bs 21, 22 of the UTRAN 90. The node Bs 21, 22 participate in the radio resource management and have the same function as the more generic base station. Furthermore, the UTRAN 90 comprises at least one Radio Network Controller (RNC) 30 connected to the node Bs 21, 22 via the Iub interface and responsible for the control of the radio resources in its domain, i.e. the node Bs 21, 22 connected to it. The RNC 30 is the service access point for all services the UTRAN 90 provides to the CN 100.

The CN 100 comprises a Mobile Switching Centre/Visitor Location Register (MSC/VLR) 40 which is a switch (MSC) and database (VLR) that serves an UE in its current location for circuit switched (CS) services. The MSC function is used to switch the CS transactions, and the VLR function holds a copy of the visiting user's service profile, as well as information on the UE's location within the serving system. The part of the network which is accessed via the MSC/VLR 40 is often referred to as CS domain. The MSC/VLR 40 is connected to a Gateway MSC (GMSC) 50 which is a switch at the point where the CN 100 is connected to external CS networks 110, e.g. Public Switched Telephone Networks (PSTNs), Integrated Services Digital Networks (ISDNs) or Public Land Mobile Networks (PLMNs). All incoming and outgoing CS connections go through the GMSC 50.

Furthermore, the CN 100 comprises a Serving GPRS (General Packet Radio Services) Support Node (SGSN) 60 having a function similar to the MSC/VLR 40 but typically used for packet switched (PS) services. The part of the network accessed via the SGSN 60 is often referred to as PS domain. The SGSN 60 is connected to a Gateway GPRS Support Node (GGSN) 70 having a functionality similar to the GMSC 50 but in relation to the PS services. The GGSN 70 is thus a switch at the point where the CN 100 is connected to external PS networks 120, e.g. the Internet.

The MSC/VLR 40 and the SGSN 60 are connected to the RNC 30 via the Iu-interface which thus connects the UTRAN 90 to the CN 100. the Iu-interface is an open interface which handles switching, routing and service control.

To achieve a multicast transmission function between the CN 100 and the UTRAN 90 via the Iu-interface, different characteristics of the multicast related data transmission needs to be taken into account not only upon the active data transmission, but also upon reservation and configuration the required resources from Iu-interface. For these different phases the current 3GPP specifications define signaling protocols such as RANAP (Radio Access Network Application Part) and IuUP (Iu Interface User Plane Protocol). The RANAP is a signalling protocol in the Iu-interface that contains all control information specified for the Radio Network Layer used for UTRAN-related issues. The IuUP also belongs to the Radio Network Layer and has been defined to be as much as possible independent of the CN domain that it is used for. The purpose of the IuUP is to carry user data related to Radio Access Bearers (RABs) over the Iu-interface. Each RAB has its own instance of the protocol. The protocol performs either a fully transparent operation, or framing for user data segments and some basic control signalling to be used for initialisation and online control. Based on these cases, the IuUP has two modes, i.e. a transparent mode for fully transparent operation and a support mode for predefined SDU (Service Data Unit) sizes corresponding to framed user data segments. Only upon the support mode, control procedures are specified.

Thus, the Iu UP is the only protocol in the above group, which is capable of transmitting not only control information but also user plane data (i.e. in this case multicast related data) and therefore it is the candidate for the user plane data transmission and the transmission of connection related control information over the Iu-interface. RANAP can be used for transmission of control information and therefore they are not directly available for multicast data transmission. The RANAP messages can be used to configure and reserve resources from the Iu-interface for the multicast sessions.

In the following, the first preferred embodiment is described with reference to the operating and signalling diagram shown in FIG. 2.

To get the full benefit of multicasting in the UTRAN 90, the same transport resource should be used, i.e. only one user plane transport resource should be reserved over the Iu-interface for a certain multicasting session to be received by several UEs. Currently, in the Iu-interface it is possible to reserve transport/RAB resources only for a particular UE by RANAP. Hence, it is not possible to make an RAB/transport reservation in the Iu-interface, which is related to more than one UE which may be identified in RANAP by an Iu signalling connection identifier.

To achieve a reservation of RAB/transport resources for more than one UE, the following new concepts and procedures in RANAP are introduced. Thereby, several UEs may receive the same multicast session transmission. These new concepts and procedures are:

Multicast UE concept with identifier for "virtual UE/area";
Multicast paging response message;
Multicast RNC calling procedure; and
Multicast RAB assignment procedure.

In the multicast UE/area concept, a virtual UE and/or area context is created for a certain multicast session (containing one or several RABs). I.e., no particular International Mobile Subscriber Identity (IMSI) is coupled to this UE/area context, instead there could be several IMSIs (i.e. IMSIs of the Ues) which are related to this particular multicast session group. This virtual UE/area context then has just one Iu signalling connection over the Iu-interface. With such a multicast UE/area concept, the existing RAB assignment procedure in RANAP can be used to reserve resources over the Iu-interface. Alternatively, the virtual UE/area context could consists of a list of multicast area Ids, instead of IMSIs. The SGSN 60 may generate or derive this area list e.g. based on information which it could fetch from the HLR, VLR etc.

Thus, three options are given for the content of the virtual UE/area context:

1) group of IMSIs, corresponding to particular UE associated with a particular multicast group;
2) group of multicast area IDs associated with particular multicast services; and
3) a combination of the above, meaning that only specific UEs can receive in specific areas certain multicast sessions. (This option is related to location services).

Thus, in summary, the virtual UE/area context created for a certain multicast session could be coupled to several IMSIs or/and multicast area IDs.

Figure 2:
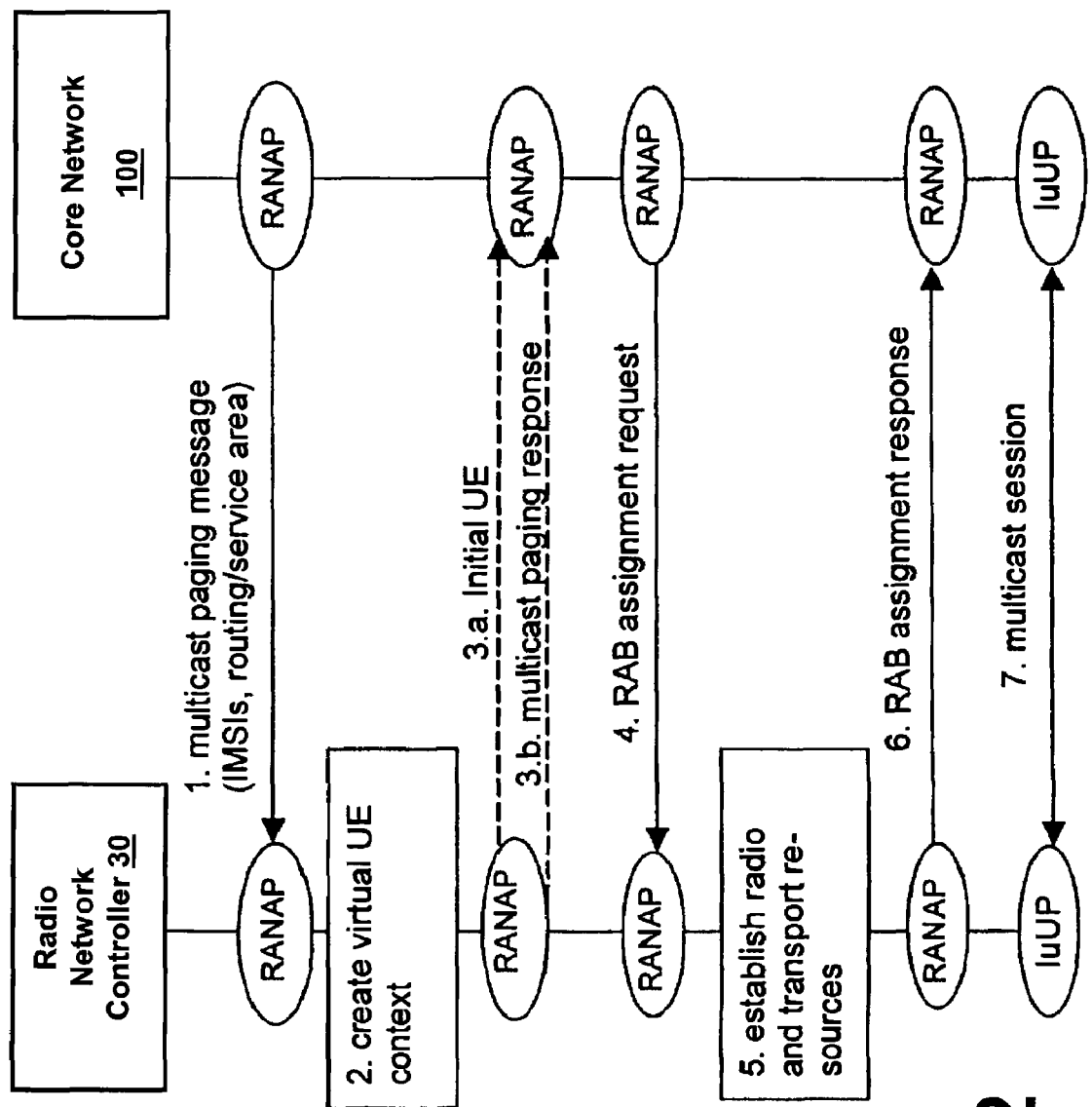
FIG. 2 shows an operating and signaling diagram indicating a multicasting procedure according to a first preferred embodiment.

As can be gathered from FIG. 2, a paging message which may be a currently defined message to which all the IMSIs of the UEs included in the desired multicast group related to this virtual UE/area and the identifier (e.g. virtual IMSI) for this virtual UE/area may have been added is generated at a network node (e.g. the SGSN 60) of the CN 100 and transmitted in step 1 from the CN 100 to the RNC 30 using RANAP. A virtual UE/area context can then be established in the RNC 30 in step 2 after it has received the paging message from the CN 100. The paging message may also include a routing and/or service area information indicating the area to which the multicast session should be transmitted. The RNC 30 can then reply to the CN 100 with Initial UE message without any NAS PDU (Non Access Stratum Packet Data Unit) (step 3.*a*) or, alternatively, with the new multicast paging response message, which would be a new RANAP message (step 3.*b*).

As an alternative procedure, the new multicast RNC calling procedure can be used to indicate to the RNC 30 e.g. by multicast RNC calling/response messages that a multicast session is planned/requested to be established to the UEs identified by IMSIs and/or virtual IMSI and/or these routing/service areas in the multicast RNC calling message. This multicast calling procedure is provided only between the CN 100 and the UTRAN 90, and the aim is to reserve required resources for the session from the Iu-interface. Thus, this alternative multicast RNC calling procedure may replace the above steps 1 to 3.*a*/3.*b*.

Then, the new multicast RAB assignment procedure is used to establish RABs for the multicast session over the Iu-interface via RANAP. In addition to existing information, a (multicast) RAB assignment request message, which is transmitted from the CN 100 to the RNC 30 in step 4, may contain information indicating which UEs (identified by IMSIs)—if not included in the paging message of step 1—should be able to receive the multicast transmission or to which routing/location/service areas the multicast transmission is directed. Optionally, an additional information element (IE) may be added to indicate that this RAB is used for a multicast transmission. Based on this information, the RNC 30 can then establish the needed radio and transport resources in the UTRAN 90 to support the requested multicast session (step 5). Thereafter, the RNC 30 responds to the CN 100 by transmitting an RAB assignment response message (step 6).

If paging procedures are used before RABs for multicast are requested, the connection oriented signaling connection control part (SCCP) mode may be used for the RANAP messages. With the new multicast RAB assignment procedure including the IMSI and/or location/routing/service areas, the connectionless mode of SCCP for RANAP messages can be used as well.

Finally, in step 7, a multicast session is performed using a IuUP protocol signaling via the established Iu signaling connection. As regards the timing of the configuration of the Iu-interface for the multicast session, the Iu signaling connection to be used to transfer control messages between the RNC 30 and the CN 100 can either be established when the RNC 30 is configured (i.e. it exists as long as the RNC 30 is configured) in case a new multicast session (virtual UE/area) is created and released after the multicast session (virtual UE/area) is terminated, or it can be established when the first multicast session in the RNC 30 is established and can then be used for other multicast session as well, i.e. the control messages for a certain session are multiplexed to the same Iu signaling connection. E.g., the virtual UE/area identifier can be used identify different multicast sessions.

Upon RNC configuration or when first multicast session in the RNC 30 is established, the reserved resources can be served based on Quality of Service (QoS) requirements, i.e. video and text files are using different Iu-interface resources. As an alternative, it is possible to reserve only one "pipe", which is capable of transmitting all kinds of data types.

When a new multicast session (virtual UE/area) is created and released, the resources are reserved based on data type demands and therefore each multicast session will have Iu resources of their own.

In order to send the multicast related data and the corresponding control information between the CN 100 and the UTRAN 90 the IuUP protocol is used for this purpose in the first preferred embodiment. However, because the current IuUP concept doesn't support transmission of such data, which is not addressed to any particular UE, some modifications to the current concept are required. Therefore, a new mode is introduced to the Iu UP protocol layer. This new mode is named as a "Multicast Support" (MuS) mode, which is meant to provide not only multicast related data transmission over the Iu-interface but also transmission of corresponding control information between the UTRAN 90 and e.g. the SGSN 60 of the CN 100. The MuS mode multicast data transmission may occur only in the downlink direction from the CN 100 to the UTRAN 90, whereas transmission of control information may be bi-directional.

In the MuS mode, the transmitted control information can be divided into two categories:

1) directly multicast data related control information
2) other connection related data transmission.

The first category contains such information, which is always transmitted along with the corresponding multicast data as an inband signaling, i.e. information is included into the header of a multicast SDU. This information may contain information such as session identification, information about the start and the end of the session, the order of the SDUs, multicast group information, scheduling related information (e.g. in which cell data must be sent, how many times, priority etc).

The second category contains such information, which is needed to take care of the successful data transmission between the SGSN 60 and the UTRAN 90. This kind of information could consists of e.g. flow control information, information for transmission management like reset requests, deletion requests, transmission related parameter updating etc.

The main difference in this case compared to the currently defined modes for IuUP (i.e. transparent mode, support mode for predefined SDU size) is that in this MuS mode data is not addressed to any single UE, but is always belonging to the multicast session, i.e. several UEs in the cell.

Figure 3:
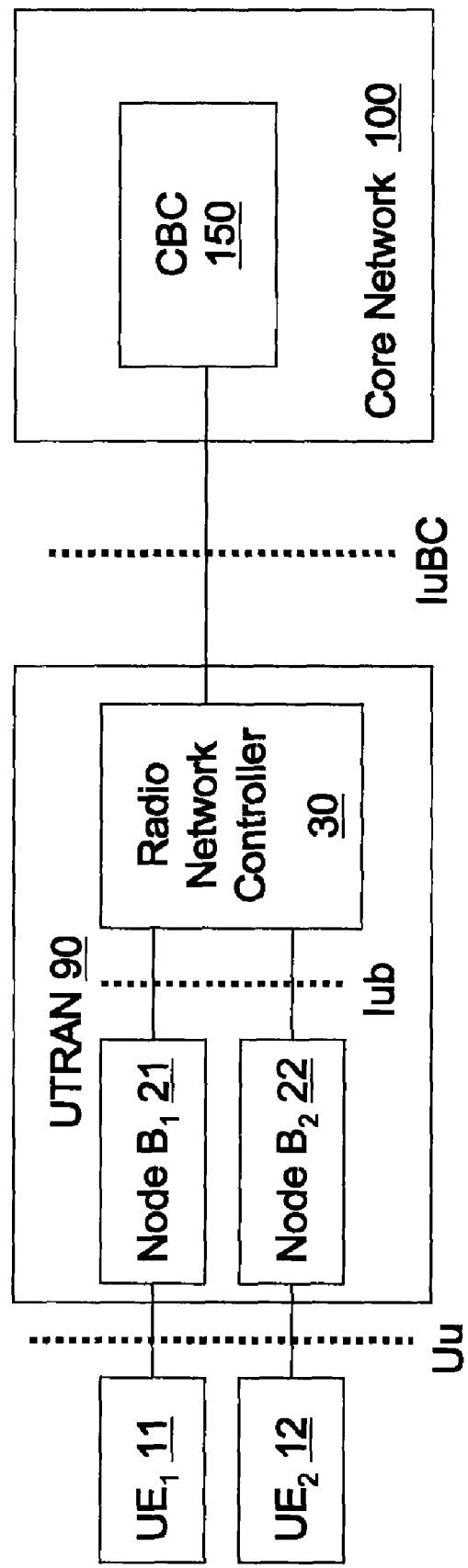
FIG. 3 shows a schematic block diagram of an architecture of a cell broadcast service used in a second preferred embodiment.

FIG. 3 shows schematic block diagram of an architecture of a cell broadcast service used in the second preferred embodiment. The basic network structure comprises a cell broadcast center (CBC) 150 which is part of the CN 100 and connected to a routing node e.g. an SGSN (not shown) via the Bc reference point.

Thus, the CBC 150 can reach every RNC 30 via the user plane of the Iu interface. On the logical interface between the CBC 150 and the RNC 30, a mandatory protocol IuBC is defined. Based on this architecture and the current requirements for cell broadcast, other core network elements like MSC, VLR (Visitor Location Register), HLR (Home Location Register) etc are not involved in the service delivery.

If the IuBC interface is used for multicast transmission, both control information and user plane information must be sent by using the same transmission protocol of the IuBC-interface, i.e. the Service Area Broadcast Protocol (SABP) specified between the CBC 150 and the RNC 30, to fulfil the CBC-RNC communication requirements over the IuBC reference point. The SABP consists of elementary procedures (EPs) which are units of interaction between the CN 100 (i.e. CBC 150) and the RNC 30. The EPs are defined separately and are intended to be used to build up complete sequences in a flexible manner. Currently, the CBC 150 and the SABP are designed for transmission of the cell broadcast messages, which in practice means that all UEs, which are in the cell, are allowed to received the transmitted data.

In order to support multicast data transmission through the IuBC-interface, the concept in the SABP can be divided between two modes, a cell broadcast service mode (CBS) and a Multicast Service (MuS) mode. The CBS mode consists of such transactions and control and data frames, which are already now defined for the cell broadcast services. In this case data is transmitted between the CBC 150 (at the CN side) and a BMC (at the RNC side).

The new MuS mode is taken into use when data is to be transmitted to a group of UEs under the CBC 150. In this mode, the control and/or data frames could be transmitted either between the CBC 150 and an "enhanced BMC" or between the CBC 150 and a new multicast related protocol layer at the RNC side. The available frames of this mode can be divided into three groups:

1) data frames
2) data related control frames
3) management control frames.

The data frames consist not only of user plane data, but also of such control information, which is required to schedule, cipher etc. data properly at the UTRAN side.

Furthermore, the data related control frames consist of information, which is required to control data transmission from the CBC 150 and to control data transmission between different sessions. It also may be used to change the used configuration at the UTRAN side and to provide e.g. such transactions like deletion/reset of outdated data from the UTRAN 90 (this data can be either control or user plane data).

Finally, the management control frames are used to same purpose that what e.g. RANAP is used on the Iu-interface. However also in this case some modifications are require, as described in the first preferred embodiment.

If no new mode is to be introduced, a new protocol layer could be introduced on the IuBC-interface. This new protocol layer may be called Multicast Area Broadcast Protocol (MABP). The MABP protocol layer could be terminated at the CN side in the CBC 150 or a MMC (Multicast/broadcast Multimedia Centre), if a new network device is provided at the CN side, and at the RNC 30 either in the "enhanced BMC" or in a new multicast related protocol layer. Also in this case, the idea is to separate the multicast related frames from the cell broadcast related frames in order to avoid radical modifications to the cell broadcast concept.

Another alternative is to use the SABP protocol on the IuBC-interface and to modify the currently used CBC PDU frame structure in such a way that multicast related frames could be separated from the cell broadcast related frames. This can be done by including into each frame e.g. a new field which indicates whether the corresponding frame is containing multicast related data (i.e. control or user plane data), cell broadcast related data or whether this frame is valid to both of these service types. In this way, it is possible to use for the multicast related data transmission also those frames which are already defined for the cell broadcast transmission and which are also suitable for the multicast services. This method also allows an identification of those new multicast service control frames which are not currently needed for cell broadcast services.

Despite of which of the above three method is used on the IuBC-interface to organise and support the multicast data transmission, the configuration and the timing to configure the signaling connection through the Iu-BC interface could follow the same principles as defined in the first preferred embodiment.

It is noted that the present invention is not restricted to the specific network nodes, signalling protocols and network types described in the preferred embodiments described above. In particular, the multicast transmission concept can be used on any interface structure between a radio access network node and a core network node. The preferred embodiments may thus vary within the scope of the attached claims.

The invention claimed is:

1. A method for performing a multicast transmission in a network, the method comprising:
generating a message comprising identification information at a network node of a core network, wherein the identification information comprises an indicator of a virtual context associated with a multicast group, and wherein the virtual context corresponds to a plurality of respective International Mobile Subscriber Identity (IMSI) identifiers only for the terminal devices of the multicast group such that the multicast message is to be sent only to the terminal devices of the multicast group; and
transmitting the message from the network node of the core network to a radio network controller of a radio access network and simultaneously reserving resources for each of the terminal devices of the multicast group using a control information transmission protocol, wherein the control information transmission protocol comprises a radio access network application part protocol.

2. The method of claim 1, further comprising receiving an initial user equipment message without a non access stratum packet data unit from the radio access network at the core network.

3. The method of claim 1, further comprising receiving a multicast paging response message from the radio access network at the core network.

4. The method of claim 1, further comprising transmitting a radio access bearer assignment request message from the core network to the radio access network, wherein the radio access bearer assignment request message comprises an information element that indicates the radio access bearer assignment request message is for multicast transmission.

5. The method of claim 4, further comprising receiving a radio access bearer assignment response message from the radio access network at the core network.

6. The method of claim 1, wherein the message is a paging message.

7. The method of claim 1, wherein a signaling connection control part mode of the radio access network application part protocol is used for transmitting messages of the control information transmission protocol.

8. The method of claim 1, wherein a signaling connection control part mode is used for transmitting the message.

9. The method of claim 1, wherein the multicast group includes all terminal devices to which a multicast message is to be sent.

10. A method for performing a multicast transmission in a network, the method comprising:
receiving a message comprising identification information from a network node of a core network at a radio network controller of a radio access network, wherein the identification information comprises an indicator of a plurality of terminal devices in a multicast group to which a multicast transmission is directed, and wherein the indicator identifies a virtual context associated with the multicast group;
simultaneously reserving resources for each of the plurality of terminal devices in the multicast group using a control information transmission protocol, wherein the control information transmission protocol comprises a radio access network application part protocol; and
establishing a signaling connection by creating a virtual context in the radio network controller of the radio access network based on the identification information received from the network node of the core network, wherein the virtual context corresponds to a plurality of respective International Mobile Subscriber Identity (IMSI) identifiers only of the plurality of terminal devices in the multicast group, and wherein the plurality of terminal devices includes all terminal devices to which a multicast message is to be sent such that the multicast message is to be sent only to the terminal devices of the multicast group.

11. The method of claim 10, further comprising transmitting an initial user equipment message without a non access stratum packet data unit from the radio access network to the core network.

12. The method of claim 10, further comprising transmitting a multicast paging response message from the radio access network to the core network.

13. The method of claim 10, further comprising receiving a radio access bearer assignment request message from the core network at the radio access network and establishing radio and transport resources based on the radio access bearer assignment request message.

14. The method of claim 13, further comprising transmitting a radio access bearer assignment response message from the radio access network at the core network.

15. The method of claim 10, wherein the virtual context is coupled to at least one of a subscriber identity and a multicast area identifier.

16. The method of claim 10, wherein the virtual context has the signaling connection as a single signaling connection.

17. The method of claim 10, wherein the signaling connection is an Iu interface connection.

18. The method of claim 10, wherein a multicast radio access bearer assignment procedure is used to establish the signaling connection.

19. The method of claim 10, wherein said signaling connection is established when a new multicast session is created, and released after said multicast session is terminated.

20. The method of claim 19, wherein said signaling connection is used for other multicast sessions.

21. The method of claim 10, wherein different interface resources are reserved based on quality requirements of data types transmitted through said signaling connection.

22. The method of claim 10, wherein a single pipe is reserved for all data types transmitted through said signaling connection.

23. The method of claim 10, further comprising receiving control messages from the network node via the signaling connection, wherein the control messages are regarding resources for at least two of the plurality of terminal devices, and wherein the signaling connection is a single Iu signaling connection.

* * * * *

UNITED STATES PATENT AND TRADEMARK OFFICE
CERTIFICATE OF CORRECTION

PATENT NO. : 8,385,361 B2  
APPLICATION NO. : 10/493162  
DATED : February 26, 2013  
INVENTOR(S) : Sarkkinen et al.

It is certified that error appears in the above-identified patent and that said Letters Patent is hereby corrected as shown below:

In the Specification

In Column 1, Line 26, delete "Cell." and insert -- Cell --, therefor.

In Column 1, Line 48, delete "to received" and insert -- to receive --, therefor.

In Column 2, Line 51, delete "may," and insert -- may --, therefor.

In Column 3, Line 60, delete "DESCRIPTION" and insert -- DETAILED DESCRIPTION --, therefor.

In Column 4, Line 17, delete "MSCNLR 40" and insert -- MSC/VLR 40 --, therefor.

In Column 4, Line 18, delete "MSCNLR 40" and insert -- MSC/VLR 40 --, therefor.

In Column 4, Line 27, delete "MSCNLR 40" and insert -- MSC/VLR 40 --, therefor.

In Column 4, Line 35, delete "MSCNLR 40" and insert -- MSC/VLR 40 --, therefor.

In Column 4, Line 64, delete "Iu UP" and insert -- IuUP --, therefor.

In Column 5, Line 33, delete "Ues)" and insert -- UEs) --, therefor.

In Column 7, Line 3, delete "Iu UP" and insert -- IuUP --, therefor.

In Column 7, Line 42, delete "Bc" and insert -- BC --, therefor.

In Column 7, Lines 43-49, delete "Thus, the CBC 150 can reach every RNC 30 via the user plane of the Iu interface. On the logical interface between the CBC 150 and the RNC 30, a mandatory protocol IuBC is defined. Based on this architecture and the current requirements for cell broadcast, other core Signed and Sealed this  
First Day of April, 2014

Michelle K. Lee  
*Deputy Director of the United States Patent and Trademark Office* network elements like MSC, VLR (Visitor Location Register), HLR (Home Location Register) etc are not involved in the service delivery." and insert the same at Line 42, after "reference point." as a continuation paragraph.

In Column 7, Line 63, delete "to received" and insert -- to receive --, therefor.

UNITED STATES PATENT AND TRADEMARK OFFICE
CERTIFICATE OF CORRECTION

| | | |
|---|---|---|
| PATENT NO. | : 8,385,361 B2 | Page 1 of 1 |
| APPLICATION NO. | : 10/493162 | |
| DATED | : February 26, 2013 | |
| INVENTOR(S) | : Sarkkinen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this
Eighteenth Day of November, 2014

Michelle K. Lee
*Deputy Director of the United States Patent and Trademark Office*